United States Patent
Huber et al.

(10) Patent No.: US 10,245,661 B2
(45) Date of Patent: Apr. 2, 2019

(54) WIRE GUIDE ROLL FOR WIRE SAW AND METHOD

(75) Inventors: Anton Huber, Bughausen (DE);
Engelbert Auer, Burgkirchen (DE);
Manfred Schoenhofer, Julbach (DE);
Helmut Seehofer, Burghausen (DE);
Peter Wiesner, Reut (DE)

(73) Assignee: Siltronic AG, Munich (DE)

(*) Notice: Subject to any disclaimer, the term of this patent is extended or adjusted under 35 U.S.C. 154(b) by 2265 days.

(21) Appl. No.: 12/106,428

(22) Filed: Apr. 21, 2008

(65) Prior Publication Data
US 2008/0264228 A1 Oct. 30, 2008

(30) Foreign Application Priority Data
Apr. 25, 2007 (DE) .................. 10 2007 019 566

(51) Int. Cl.
*B23D 57/00* (2006.01)
*B23D 61/18* (2006.01)
*B24B 27/06* (2006.01)
*B28D 5/04* (2006.01)
*B65H 57/14* (2006.01)

(52) U.S. Cl.
CPC ........ *B23D 57/0053* (2013.01); *B23D 61/18* (2013.01); *B24B 27/0633* (2013.01); *B28D 5/045* (2013.01); *B65H 57/14* (2013.01); *Y10T 83/696* (2015.04); *Y10T 83/9292* (2015.04)

(58) Field of Classification Search
CPC ............... B23D 57/0053; B23D 61/18; B24B 27/0633; B26D 1/50; B28D 5/045; B65H 57/14; Y10T 83/9292
USPC ....... 83/651.1; 125/21; 474/178; 492/30, 56; 451/296, 493, 496
See application file for complete search history.

(56) References Cited

U.S. PATENT DOCUMENTS

| | | | | | |
|---|---|---|---|---|---|
| 2,958,323 | A | * | 11/1960 | Knoph et al. | ................ 125/21 |
| 4,134,384 | A | * | 1/1979 | Schafft et al. | ..... B23D 57/0053 |
| | | | | | 125/21 |
| 4,406,196 | A | * | 9/1983 | Roncato et al. | ..... B26D 7/1818 |
| | | | | | 83/117 |

(Continued)

FOREIGN PATENT DOCUMENTS

| | | |
|---|---|---|
| DE | 102 20 640 A1 | 12/2002 |
| DE | 103 49 287 A1 | 6/2005 |
| JP | 11-099465 A2 | 4/1999 |
| JP | 11-123648 * | 5/1999 |

(Continued)

OTHER PUBLICATIONS

English Abstract corresponding to JP 2006-102917 A2.
English Abstract corresponding to JP 11-099465 A2.
English Abstract corresponding to JP 11-262853.

(Continued)

*Primary Examiner* — Clark F Dexter
(74) *Attorney, Agent, or Firm* — Brooks Kushman P.C.

(57) ABSTRACT

A wire guide roll for use in wire saws for simultaneously slicing a multiplicity of wafers from a cylindrical workpiece is provided with a coating having a thickness of at least 2 mm and at most 7.5 mm of a material which has a Shore A hardness of at least 60 and at most 99, and which contains a multiplicity of grooves through which the sawing wire is guided, the grooves each having a curved groove base with a radius of curvature which is 0.25-1.6 times the sawing wire diameter, and an aperture angle of 60-130°. A multiplicity of wafers are simultaneously sliced from a cylindrical workpiece by a wire saw using such wire guide rolls.

21 Claims, 4 Drawing Sheets

(56) References Cited

U.S. PATENT DOCUMENTS

| | | | |
|---|---|---|---|
| 4,465,161 A * | 8/1984 | Ohta et al. | 254/372 |
| 5,586,639 A * | 12/1996 | Yoshino | 198/690.2 |
| 5,758,633 A | 6/1998 | Hauser | |
| 5,906,192 A * | 5/1999 | Wakuda | 125/16.02 |
| 5,910,203 A * | 6/1999 | Hauser | 83/651.1 |
| 6,371,101 B1 * | 4/2002 | Hauser | 125/16.01 |
| 6,381,830 B1 * | 5/2002 | Chikuba et al. | 29/557 |
| 6,505,394 B2 * | 1/2003 | Chikuba et al. | 29/557 |
| 6,550,364 B2 * | 4/2003 | Hauser | 83/651.1 |
| 6,572,516 B2 * | 6/2003 | Clarke et al. | 492/30 |
| 6,620,494 B2 | 9/2003 | Will et al. | |
| 6,837,778 B2 * | 1/2005 | Kondo et al. | 451/49 |
| 6,896,595 B2 * | 5/2005 | Kondo et al. | 451/49 |
| 6,945,242 B2 * | 9/2005 | Kondo et al. | 125/21 |
| 2001/0029939 A1 | 10/2001 | Mazaki et al. | |
| 2002/0100354 A1 * | 8/2002 | Hauser | 83/651.1 |
| 2002/0115390 A1 * | 8/2002 | Kondo et al. | 451/49 |

FOREIGN PATENT DOCUMENTS

| | | |
|---|---|---|
| JP | 11-262853 | 9/1999 |
| JP | 2002018831 A | 1/2002 |
| JP | 2004114235 A | 4/2004 |
| JP | 2006075969 A | 3/2006 |
| JP | 2006-102917 A2 | 4/2006 |
| JP | 2007090466 A | 4/2007 |
| TW | 480311 | 12/1990 |
| TW | I256530 | 7/1992 |
| TW | 442370 | 6/2001 |
| TW | 499353 | 8/2002 |

OTHER PUBLICATIONS

English Derwent Abstract AN 2005-480266 corresponding to DE 103 49 287 A1.

English Derwent Abstract AN 2003-122201 corresponding to DE 102 20 640 A1.

* cited by examiner

WIRE GUIDE ROLL FOR WIRE SAW AND METHOD

BACKGROUND OF THE INVENTION

1. Field of the Invention

The invention relates to a wire guide roll for use in wire saws for simultaneously slicing a multiplicity of wafers from a cylindrical workpiece, in particular from a workpiece consisting of semiconductor material, wherein with the aid of a forward feed device, the workpiece and a wire gang of a wire saw execute a relative movement directed perpendicularly to the longitudinal axis of the workpiece, by which the workpiece is guided through the wire gang.

2. Background Art

Semiconductor wafers are generally produced by slicing a cylindrical mono- or polycrystalline workpiece of the semiconductor material simultaneously into a multiplicity of semiconductor wafers in one working step with the aid of a wire saw.

The essential components of these wire saws include a machine frame, a forward feed device, and a sawing tool which consists of a gang of parallel wire sections. The workpiece is fixed on a so-called sawing strip, generally by cementing or adhesive bonding. The sawing strip is in turn fastened on a mounting plate, in order to clamp the workpiece in the wire saw.

The wire gang of the wire saw is generally formed by a multiplicity of parallel wire sections, which are tensioned between at least two wire guide rolls, the wire guide rolls being rotatably mounted and at least one of them being driven. The wire sections generally belong to a single finite wire, which is guided spirally around the roll system and is unwound from a stock roll onto a receiver roll.

During the sawing process, the forward feed device induces a relative movement of the wire sections and the workpiece directed against one another. As a result of this forward feed movement, the wire, on which a sawing suspension is applied, works to form parallel sawing kerfs through the workpiece. The sawing suspension, which is also referred to as a slurry, contains hard material particles, for example of silicon carbide, which are suspended in a liquid. A sawing wire with firmly bound abrasive may also be used. In this case, it is not necessary to apply a sawing suspension; it is merely necessary to supply a liquid cooling lubricant (for example water), which protects the wire and the workpiece against overheating and at the same time transports workpiece swarf away from the cutting grooves.

The production of semiconductor wafers from cylindrical semiconductor material, for example from single-crystal ingots, places stringent requirements on the sawing method. The purpose of the sawing method is generally that each sawn semiconductor wafer should have two surfaces which are as planar as possible and are mutually parallel.

Besides thickness variation, the planarity of the two surfaces of the semiconductor wafer is of great importance. After a wire saw has been used to slice a semiconductor single crystal, for example a silicon single crystal, the wafers thereby produced have a wavy surface. This waviness may be partially or fully removed in the subsequent steps, for example grinding or lapping, depending on the wavelength and amplitude of the waviness as well as the depth of the material removal. In the least favorable case, such surface irregularities (undulations, waviness), which may have periodicities of from a few mm up to for example 50 mm, may still be detected even after polishing on the finished semiconductor wafer, where they have a detrimental effect on the local geometry.

The parameters "bow" and "warp", as measures of the deviation of the actual wafer shape from the desired ideal wafer shape (or "sori") depend crucially on the straightness of the cut, which is in turn crucially determined by properties of the wire guide rolls being used.

The wire guide rolls are conventionally provided with a coating. They furthermore comprise a multiplicity of grooves through which the sawing wire is guided, and by means of which the wire gang of the wire saw is formed.

Wire guide rolls which comprise a polyurethane coating are conventionally used. Polyurethanes are substantially resistant to the abrasive slurry, or to abrasion due to cutting wires with bound abrasive.

Wear of the wire guide rolls, which essentially leads to modification of the geometry of the grooves, nevertheless gradually takes place in the prior art, for example after 50 operations. This, however, is undesirable since optimal guiding of the sawing wire is no longer ensured owing to such modification of the groove geometry.

JP 2006102917 A2 proposes to use urethane with 5-30% by weight of silicon carbide abrasive as a coating, so that the coating is significantly harder than a coating consisting only of urethane. With too hard a wire guide coating, however, the frictional locking between the wire and the wire guide roll is no longer ensured so that the wire gang can no longer be set optimally in motion.

This also applies for the wire guide rolls disclosed in JP 11099465 A2. Here again, the coating of the rolls is intended to consist of a material which has a hardness comparable to abrasive silicon carbide particles. Silicon carbide particles have a hardness of 3000-4000 HV (Vickers hardness).

JP 11262853 adopts a similar approach, by treating the surfaces of the wire guide rolls with low-oxygen plasma. This is intended to make the surfaces of the wire guide rolls more uniform, which is meant to give a wire guide roll lifetime about two times as long as the untreated roll. The waviness of the sawn wafers could also thereby be improved. The wire guide rolls comprise hard urethane resin surfaces. The grooves of unworn wire guide rolls have a V-shaped form which is conventional in the prior art.

SUMMARY OF THE INVENTION

It is an object of the invention to provide improved wire guide rolls for wire saws and to avoid the problems of the prior art. These and other objects are achieved by providing a wire guide roll wherein the roll has a coating with a thickness of 2 to 7.5 mm, a Shore A hardness of 60 to 99, and contains wire receiving grooves with a V-shape but with a base which is substantially circular at the bottom, with a radius between 0.25 and 1.6 times the wire diameter, and an included angle of the V between 60-130°.

DETAILED DESCRIPTION OF THE PREFERRED EMBODIMENT(S)

Figure 1:
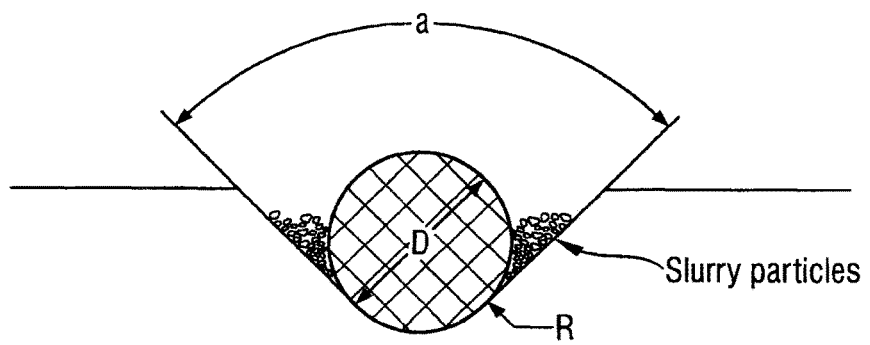
FIG. 1 schematically shows the inventive geometry of a groove of the wire guide roll.

The invention relates to a wire guide roll for use in wire saws for simultaneously slicing a multiplicity of wafers from a cylindrical workpiece, which is provided with a coating having a thickness of at least 2 mm and at most 7.5 mm and consisting of a material which has a Shore A hardness of at least 60 and at most 99, and which furthermore contains a multiplicity of grooves through which the sawing wire is guided, wherein the grooves each have a curved groove base with a radius of curvature R which is given by 0.25-1.6 times a sawing wire diameter D, and an aperture angle a of 60-130°.

The wire guide roll according to the invention comprises a coating of a material with a hardness level of at least 60 and at most 99 according to Shore A. The hardness measurement of elastomers according to Shore A is described in ISO 868. The coating of the wire guide roll preferably consists of a material with a Shore A hardness of between 82 and 99. It is most preferable to use polyurethanes based on polyester or polyether. This may involve rollable polyurethane and cast polyurethane.

The coating of the wire guide rolls should in no event be too soft, since it would not be sufficiently resistant to plastic deformation of the grooves. In this case, the sawing wire might cut into the wire guide rolls. This may entail modification of the groove geometry, so that the sawing wire is no longer guided optimally and the wire may easily escape if lateral forces occur. This will have detrimental effects on the accuracy and straightness of the cut, and therefore lead to inferior bow and warp values which cannot be improved and corrected at all or only with great outlay in subsequent processing steps.

The roll core, i.e. the base body of the wire guide roll, preferably consists of steel, for example a special steel with low thermal expansion (Invar steel). It is nevertheless also possible to use aluminum, stainless steel, titanium, carbon or composite materials such as GFP and CFP as roll core material. GFP and CFP are plastics reinforced with glass fibers or carbon fibers, respectively.

The wire guide roll contains a multiplicity of grooves for guiding the sawing wire. The grooves have a defined, uniform geometrical shape with a curved groove base and groove sidewalls having a particular aperture angle.

The groove base, in which the sawing wire is guided, has a radius of curvature R that corresponds to at least 25% of the diameter D of the sawing wire being used, but should be at most 60% greater than the diameter. This means R=0.25 D-1.6 D. Preferably, however, the radius of curvature of the groove base is less than the diameter of the sawing wire. The radius of curvature R of the grooves is preferably 0.4-0.9 times the sawing wire diameter, i.e. R=0.4 D-0.9 D.

The aperture angle of each groove is 60-130° according to the invention. The aperture angle is preferably 80-110°. The coating thickness of the wire guide roll is most preferably greater than or equal to 2 mm and less than or equal to 6 mm.

The Inventors have found that the groove shaped according to the invention presents advantages over the V-shaped groove form known from the prior art.

The coating preferably consists of polyurethane, with a particular hardness level according to the invention. Polyurethanes are compressible materials. The sawing wire tensioned over the rolls with a relatively high force (20-30 N per wire turn, usually about 300 wire turns) leads to compression of the coating in the range of a few tenths of one mm. Furthermore the compression is not constant over the entire coating, rather it is subject to variations. The wire tension, which is extremely important for the wire sawing process, depends directly on this since the following applies:

$$F = A \times E \times dl/l,$$

where F denotes the wire tension, A denotes the cross-sectional area of the wire, E denotes the modulus of elasticity, dl denotes the length change and l denotes the wire's free length. The compression of the coating will be commensurately more as the coating thickness is greater and this leads to a large variation in the wire tension, which has detrimental effects on the sawing process. On the other hand the coating thickness may not be selected to be arbitrarily small, since in this case the wire force incurred will act directly on the roll core and may lead to detachment of the coating.

The coating thickness of 2 mm-7.5 mm according to the invention avoids such variations in the wire tension and detachment of the roll coating, and it leads to an optimal geometrical quality of the wafers sliced in the wire sawing process. In the prior art, wire guide rolls with coating thicknesses of more than 8 mm, usually more than 10 mm have normally been used to date. The present invention demonstrates for the first time the relationship between the coating thickness and the lifetime of a wire guide roll.

The inventors have found that the inventive hardness of the coating of the wire guide rolls and the coating thickness according to the invention lead to an optimization of the roll wear and therefore to a longer lifetime of the wire guide rolls, which clearly promises advantages with respect to more economical use of additives. The groove shape according to the invention, in conjunction with the coating thickness, nevertheless ensures optimized guiding of the sawing wire in the grooves of the wire guide rolls, and it thus leads to an improved cutting quality and therefore to a better geometry of the sawn wafer.

The wire guide rolls according to the invention are used in wire saws. The sawing wire is in this case wound several times around the wire guide rolls, so as to form the wire gang of the wire saw. The workpieces, in particular cylindrical workpieces, which are preferably semiconductor ingots and more preferably silicon ingots, can be sawn in one working step by such a wire saw.

The geometry of the wafer in the saw's forward feed direction is determined, for example, by a scanning capacitive sensor pair. First, the difference between the front- and backside signals is taken. In order to determine the waviness, a window with a length of 10 mm is passed over the evaluation curve thus obtained. The maximum deviation within the window generates a new value for the window center (rolling boxcar filtering). The greatest deviation (peak-to-valley (PV)) within the entire scan over the wafer is the waviness_max. The waviness_in is determined in the same fashion, but only the first 50 mm of the scan (wire saw incision region) are considered. Warp is the sum of the maximum deviation (upward and downward) of the neutral shape of the entire wafer from a reference plane (three-dimensional).

Linear shape range (LSR) is the sum of the maximum deviations of the neutral shape of a scan in the saw's forward feed direction from a straight reference line (two-dimensional).

For example, the measuring instrument MX 7012 (High Resolution Thickness and Surface Profiler for as-sawn Wafer) from E+H Eichhom+Hausmann is suitable for determining these geometrical parameters.

FIG. 1 schematically shows the inventive geometrical shape of an individual groove of a wire guide roll, the radius of curvature of the groove base being denoted by R and the aperture angle of the groove sidewalls being denoted by a. Also represented are a sawing wire with diameter D as well as slurry particles (sawing suspension).

Figure 6:
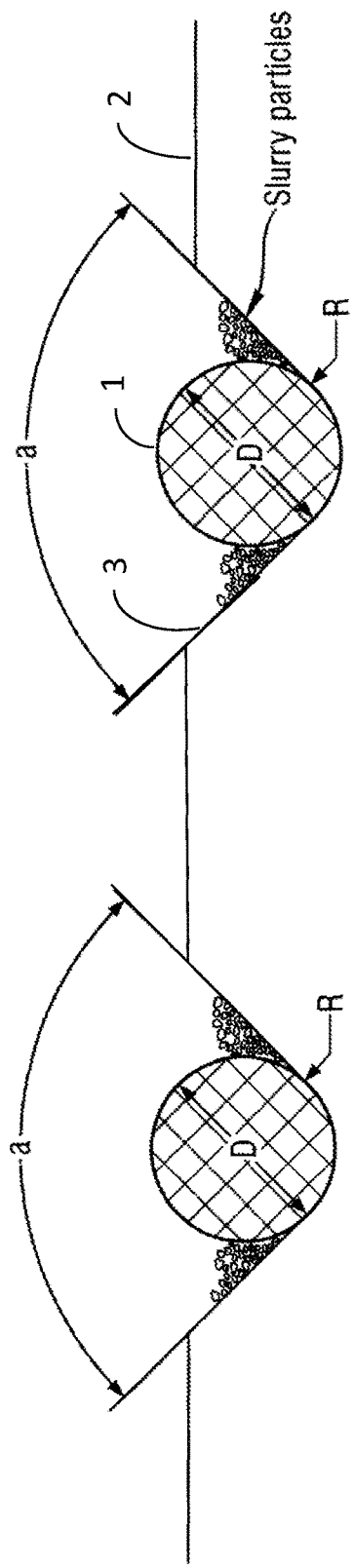
FIG. 6 illustrates a section taken radially perpendicular to one surface of a wire guide roll showing a multiplicity of grooves in the elastomeric coating.

FIG. 6 illustrates a section through a surface of a wire guide roll. An elastomer coating 2 has a multiplicity of wire grooves 3 which receive a corresponding number of turns of sawing wire 1, having a diameter D. The elastomer coating 2 coats the roll substrate. The spacing of the grooves and the wire guide roll is conventional, except for the groove diameter, the coating thickness, and the coating hardness. The drawing is schematic, and is not to scale.

Figure 2:
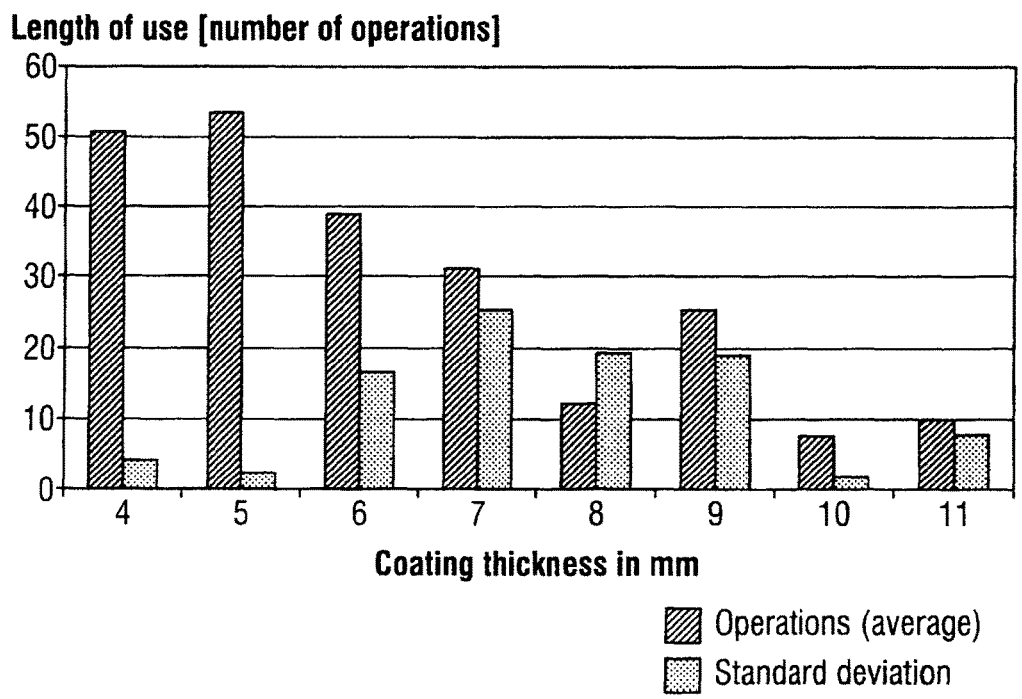
FIG. 2 shows the number of possible operations with a wire guide roll as a function of the coating thickness.

FIG. 2 shows the average number of possible operations using a wire guide roll until it is replaced, as well as the associated standard deviation, as a function of the thickness of the coating of the wire guide roll.

It may be seen that with a greater coating thickness (above 8 mm) the number of possible operations decreases. The main reason for changing the wire guide in each case is a poor cutting quality.

Figure 3:
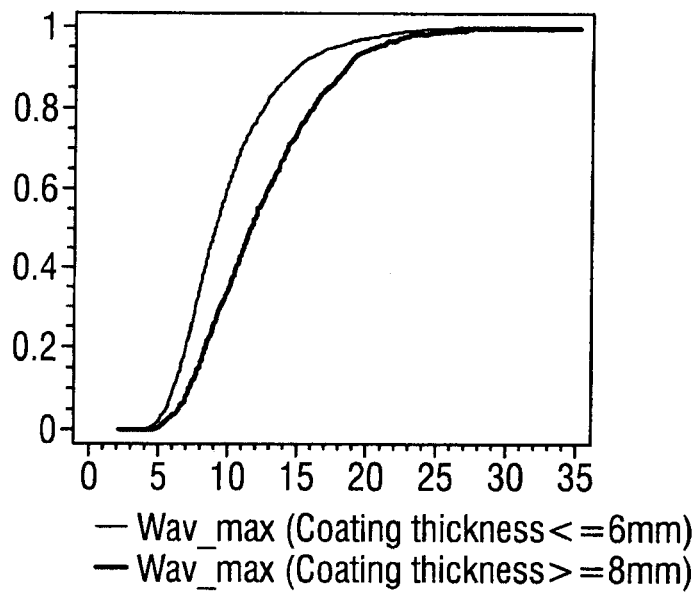
FIG. 3 shows a comparison of the geometrical parameter waviness_max for two groups of coating thicknesses of the wire guide rolls.

FIG. 3 shows the cutting quality as a function of two groups of coating thicknesses of the wire guide rolls being used.

To this end a comparison is made between the waviness_max geometrical parameters when using wire guide rolls with coating thicknesses of less than or equal to 6 mm and for wire guide rolls with coating thicknesses of greater than or equal to 8 mm. The cumulative frequency, with which the geometrical parameter occurs, is represented in each case. Better waviness_max values are found with coating thicknesses of less than or equal to 6 mm.

Figure 4:
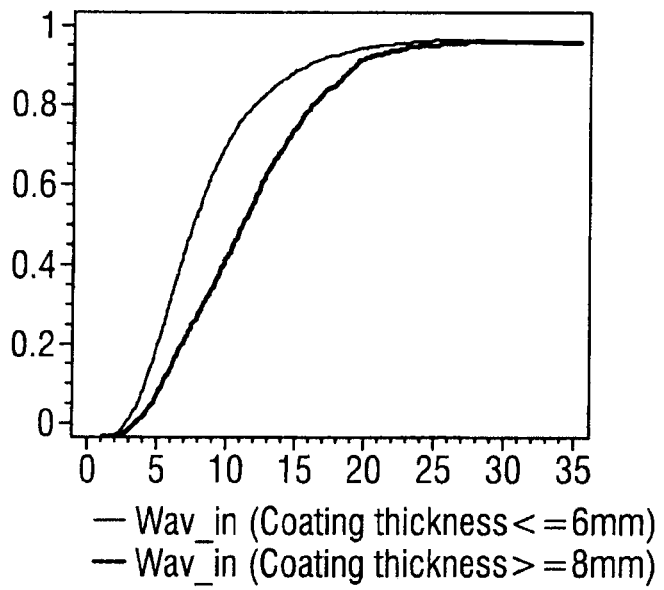
FIG. 4 shows a comparison of the geometrical parameter waviness_in for two groups of coating thicknesses of the wire guide rolls.

FIG. 4 likewise shows the cutting quality as a function of two groups of coating thicknesses of the wire guide rolls being used. To this end a comparison is made between the waviness_in geometrical parameters when using wire guide rolls with coating thicknesses of less than or equal to 6 mm and for wire guide rolls with coating thicknesses of greater than or equal to 8 mm. The cumulative frequency, with which the geometrical parameter occurs, is represented in each case. Better waviness_in values are in turn found with coating thicknesses of less than or equal to 6 mm.

Figure 5:
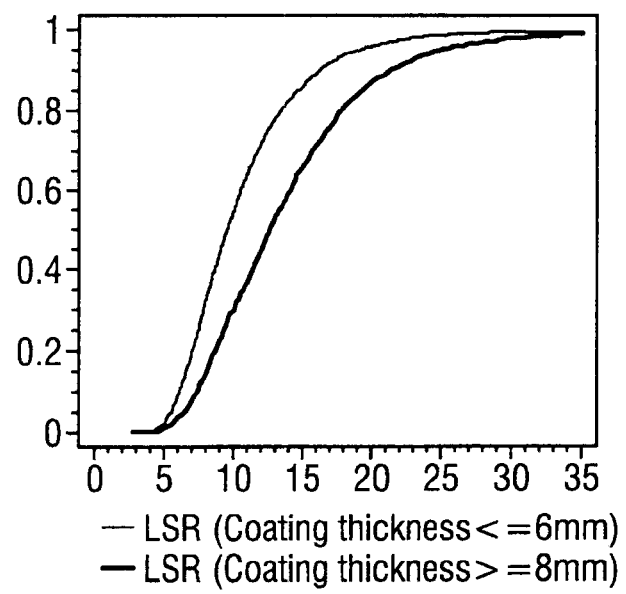
FIG. 5 shows a comparison of the geometrical parameter linear shape range (LSR, total warp) for two groups of coating thicknesses of the wire guide rolls.

The cutting quality as a function of two groups of coating thicknesses of the wire guide rolls being used is also studied in FIG. 5. To this end a comparison is made between the linear shape range geometrical parameters when using wire guide rolls with coating thicknesses of less than or equal to 6 mm and for wire guide rolls with coating thicknesses of greater than or equal to 8 mm. The cumulative frequency, with which the geometrical parameter occurs, is represented in each case. Better linear shape range (LSR) parameters are found with coating thicknesses of less than or equal to 6 mm.

Overall it is thus found that inferior cutting results are achieved with higher coating thicknesses, and that the inventive range of the coating thickness of the wire guide rolls is particularly advantageous.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A wire guide roll for guiding a sawing wire in a wire saw for simultaneously slicing a multiplicity of wafers from a cylindrical workpiece, the wire guide roll provided with a coating having a thickness of at least 2 mm and at most 7.5 mm, the coating comprising a coating material which has a Shore A hardness of at least 60 and at most 99, the coating furthermore containing a multiplicity of annular grooves adapted to guide the sawing wire in a direction perpendicular to a longitudinal axis of the wire guide roll, wherein the grooves each have a curved groove base and an aperture angle a of 60-130°, the wire guide roll suitable for guiding a multiplicity of wire segments which constitute a wire gang of the wire saw.

2. In a coated wire guide roll suitable for guiding a single sawing wire having a sawing wire diameter D in a wire saw and forming a wire gang capable of simultaneously slicing a multiplicity of wafers from a cylindrical semiconductor workpiece, the improvement comprising: providing the wire guide roll with a coating having a thickness of at least 2 mm and at most 7.5 mm, the coating comprising a coating material which has a Shore A hardness of at least 60 and at most 99, the coating furthermore containing a multiplicity of annular grooves adapted to guide the sawing wire having the sawing wire diameter D in a direction perpendicular to a longitudinal axis of the wire guide roll of the wire saw, wherein the grooves each have a curved groove base with a radius of curvature R which is 0.25-1.6 times the sawing wire diameter D, and an aperture angle a of 60-130°, the wire guide roll suitable for guiding a multiplicity of wire segments which constitute the wire gang of the wire saw.

3. The wire guide roll of claim 2, wherein the coating of the wire guide roll consists of a material with a Shore A hardness of between 82 and 99.

4. The wire guide roll of claim 3, wherein the radius of curvature R of the groove base is 0.4-0.9 times the sawing wire diameter D.

5. The wire guide roll of claim 4, wherein the aperture angle of the grooves is 80-110°.

6. A method for simultaneously slicing a multiplicity of wafers from a cylindrical workpiece by a wire saw having wire guide rolls, comprising employing at least one wire guide roll of claim 5 and slicing said cylindrical workpiece by said wire saw.

7. The wire guide roll of claim 4, wherein polyurethane is used as the coating material.

8. The wire guide roll of claim 3, wherein the aperture angle of the grooves is 80-110°.

9. The wire guide roll of claim 3, wherein polyurethane is used as the coating material.

10. A method for simultaneously slicing a multiplicity of wafers from a cylindrical workpiece by a wire saw having wire guide rolls, comprising employing at least one wire guide roll of claim 3 and slicing said cylindrical workpiece by said wire saw.

11. The wire guide roll of claim 2, wherein the radius of curvature R of the groove base is 0.4-0.9 times the sawing wire diameter D.

12. The wire guide roll of claim 11, wherein the aperture angle of the grooves is 80-110°.

13. The wire guide roll of claim 11, wherein polyurethane is used as the coating material.

14. A method for simultaneously slicing a multiplicity of wafers from a cylindrical workpiece by a wire saw having wire guide rolls, comprising employing at least one wire guide roll of claim 11 and slicing said cylindrical workpiece by said wire saw.

15. The wire guide roll of claim 2, wherein the aperture angle of the grooves is 80-110°.

16. The wire guide roll of claim 15, wherein polyurethane is used as the coating material, and the coating material thickness is from 2 mm to 6 mm.

17. A method for simultaneously slicing a multiplicity of wafers from a cylindrical workpiece by a wire saw having wire guide rolls, comprising employing at least one wire guide roll of claim 15 and slicing said cylindrical workpiece by said wire saw.

18. The wire guide roll of claim 2, wherein polyurethane is used as the coating material.

19. A method for simultaneously slicing a multiplicity of wafers from a cylindrical workpiece by sawing with a sawing wire of a diameter D in a wire saw having wire guide rolls, comprising employing at least one wire guide roll of claim 2 and slicing said cylindrical workpiece by said wire saw.

20. The wire guide roll of claim 2, wherein the multiplicity of annular grooves is such so as to accommodate about 300 turns of sawing wire.

21. The wire guide roll of claim 2, wherein the cylindrical workpiece comprises a semiconductor single crystal.

* * * * *